US006791714B1

(12) United States Patent
Ishimura

(10) Patent No.: US 6,791,714 B1
(45) Date of Patent: Sep. 14, 2004

(54) IMAGE FORMING APPARATUS CAPABLE OF SAVING CONSUMPTION OF TONER WITHOUT DETERIORATION OF PRINTING QUALITY AND METHOD THEREOF

(75) Inventor: Takanari Ishimura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/417,018

(22) Filed: Oct. 12, 1999

(30) Foreign Application Priority Data

Oct. 12, 1998 (JP) .......................................... 10-289479

(51) Int. Cl.[7] ............................ G06F 15/00; G06K 1/00

(52) U.S. Cl. ........................ 358/1.9; 358/1.2; 358/1.11; 358/1.16; 358/2.1; 382/266; 382/269

(58) Field of Search ........................... 358/1.9, 2.1, 3.1, 358/3.26, 501, 3.31, 1.13, 1.11, 1.2, 1.16, 3.27, 3.28, 3.01; 382/217, 274, 275, 266, 269, 173, 176

(56) References Cited

U.S. PATENT DOCUMENTS

| | | | | |
|---|---|---|---|---|
| 5,251,023 A | * | 10/1993 | Arimoto et al. | 358/529 |
| 5,668,635 A | * | 9/1997 | Tomida et al. | 358/296 |
| 5,835,233 A | | 11/1998 | Otsu et al. | 358/298 |
| 6,389,166 B1 | * | 5/2002 | Chang et al. | 382/188 |
| 2003/0142865 A1 | * | 7/2003 | Hirota et al. | 382/167 |

FOREIGN PATENT DOCUMENTS

| | | | | |
|---|---|---|---|---|
| JP | 62058284 | * | 3/1987 | G03G/15/06 |
| JP | 2-144574 | | 6/1990 | |
| JP | 3-275371 | | 12/1991 | |
| JP | 6-24043 | | 2/1994 | |
| JP | 7-107280 | | 4/1995 | |
| JP | 10-202951 | | 8/1998 | |

* cited by examiner

*Primary Examiner*—Mark Wallerson
*Assistant Examiner*—Melanie Vida
(74) *Attorney, Agent, or Firm*—Foley & Lardner

(57) ABSTRACT

A printer has a spreading unit 1 for spreading data sent from an upper apparatus into bit map data, a memory unit 2 for storing the bit map data spread by the spreading unit 1, an extracting unit 3 for extracting a contour-protecting shaped matrix which prevents the disappearance of a contour of an image, and a printing unit 7 which stores template data and a toner consumption saving pattern and which prints dot data of the bit map data based on a shape of the contour-protecting shaped matrix. The extracted matrix data are compared with the template data. When the matrix data corresponds with the template data, a noted pixel positioned in a central portion of the matrix is replaced with the toner consumption saving pattern. Accordingly, numbers of black dots can be decreased in a part of image data to save toner consumption in the printer.

7 Claims, 5 Drawing Sheets

IMAGE FORMING APPARATUS CAPABLE OF SAVING CONSUMPTION OF TONER WITHOUT DETERIORATION OF PRINTING QUALITY AND METHOD THEREOF

BACKGROUND OF THE INVENTION

This invention relates to an image forming apparatus, such as a printer, and a method of saving consumption of toner, particularly to the image forming apparatus and the method of saving consumption of toner without deterioration of printing quality.

Conventionally, in order to save a consumption of toner, a toner density adjusting volume is provided in an image forming apparatus, such as a printer. When printing must be done with the toner being saved, the printing is done with lower density of toner by adjusting the toner density adjusting volume. However, in such a method, it is required to readjust the toner density adjusting volume when a normal printing is desired.

Under the circumstances, some proposals are made to save the consumption of toner without adjusting such a volume.

A proposal is exemplified, as a first prior art, in unexamined Japanese Patent Publication No.Hei 6-24043, namely, 24043/1994. The first prior art has a data transmission portion for transmitting dot image data to a print head as a video signal, and a thinning portion positioned between the data transmission portion and the print head. The thinning portion detects a specific dot pattern which consists of a plurality of same dot patterns sequentially located. Then, the thinning portion converts each black dot positioned in both ends of a sequence of black dots into each white dot in the specific dot pattern data.

On the other hand, an another proposal is exemplified, as a second prior art, in unexamined Japanese Patent Publications No.Hei 2-144574, namely, 144574/1990. In the second prior art, a consumption of toner can be saved responsive to numbers of skipped dots, by skipping numbers of dots consisting of a character and carrying out printing lo based on dot data thus skipped.

Further, a still another proposal is exemplified, as a third prior art, in unexamined Japanese Patent Publications No.Hei 7-107280, namely, 107280/1995. The third prior art has a distinguishing portion for distinguishing a contour of image data from an inner portion thereof. A toner saving mode is applied to the inner portion with each one pixel constituting the contour of the image data being remained. Accordingly, deterioration of quality of image is prevented.

By the use of methods of saving a consumption of toner thus mentioned as the first, the second, and the third prior arts, it becomes possible to save the consumption of toner in spite of the printing with lower density of toner after adjusting the toner density adjusting volume.

However, in these prior arts, saving of toner is achieved by reducing black dot data. As a result, smoothness of a character, a circle, and a line is deteriorated. For example, a fine character is thereby deformed in a printed manner. It is Inevitably caused to occur that the deformed fine character cannot be read with ease.

It is a recent trend that an image forming apparatus, such as a printer, has a higher resolution and that various fonts are used in the image forming apparatus. Under the trend, if Roman-type characters in which a weight of a character varies are subjected to the thinning operation, for example, of the first prior art, the Roman-type characters becomes more blurred. In the third prior art, a toner saving is sometimes applied with each one pixel constituting the contour of the image data being remained. A width of one dot line becomes not more than 0.021 mm (0.042 mm in a case of 600 dpi) to produce an extremely fine line. By these characteristics, toner is not attached to the contour portion, so that the contour is disappeared. Consequently, deterioration of quality of image becomes inevitable.

SUMMARY OF THE INVENTION

It is therefore an object of the present invention to provide an image forming apparatus which is capable of saving consumption of toner without deterioration of printing quality and a method thereof.

Other objects of this invention will become clear as the description proceeds.

According to an aspect of this invention, there is provided an image forming apparatus which is for use in printing data sent from an upper apparatus, said image forming apparatus comprising: spreading means for spreading said data sent from said upper apparatus into bit map data consisting of dot data; storing means for storing said bit map data spread by said spreading means; extracting means for extracting contour-protecting shaped matrix data having a contour-protecting shape which prevents a contour of image from being disappeared; and printing means for printing said dot data based on said contour-protecting shape.

The image forming apparatus may be a printer.

The contour-protecting shaped matrix data may comprise 3×3 pixels, two pixels added in upper and lower sides, respectively, and further two pixels added in left hand and right hand sides, respectively.

The template data may be composed of all black dots in the same shape as that of said contour-protecting shaped matrix data.

The image forming apparatus may further comprise template data memorizing means for memorizing template data which previously define a standard shape of a character and a symbol.

The image forming apparatus may further comprise toner consumption saving pattern memorizing means for memorizing toner consumption saving pattern data which corresponds said standard shape of said character and said symbol.

The image forming apparatus may further comprise toner consumption control means for forming a final shape which is printed finally based on each of said contour-protecting shaped matrix data, said template data, and said toner consumption saving pattern data.

According to another aspect of this invention, there is provided a method of saving consumption of toner of an image forming apparatus for use in printing data sent from an upper apparatus, said method comprising the steps of: spreading said data sent from said upper apparatus into bit map data consisting of dot data; storing said bit map data spread in said spreading step; extracting contour-protecting shaped matrix data having a contour-protecting shape which prevents a contour of image from being disappeared; and printing said dot data based on said contour-protecting shape.

The method may further comprise the step of memorizing template data which previously define a standard shape of a character and a symbol.

The method may further comprise the step of memorizing toner consumption saving pattern data which corresponds said standard shape of said character and said symbol.

The method may further comprise the step of controlling toner consumption to form a final shape which is printed finally based on each of said contour-protecting shaped matrix data, said template data, and said toner consumption saving pattern data.

DETAILED DESCRIPTION OF THE PREFERRED EMBODIMENTS

Figure 1:
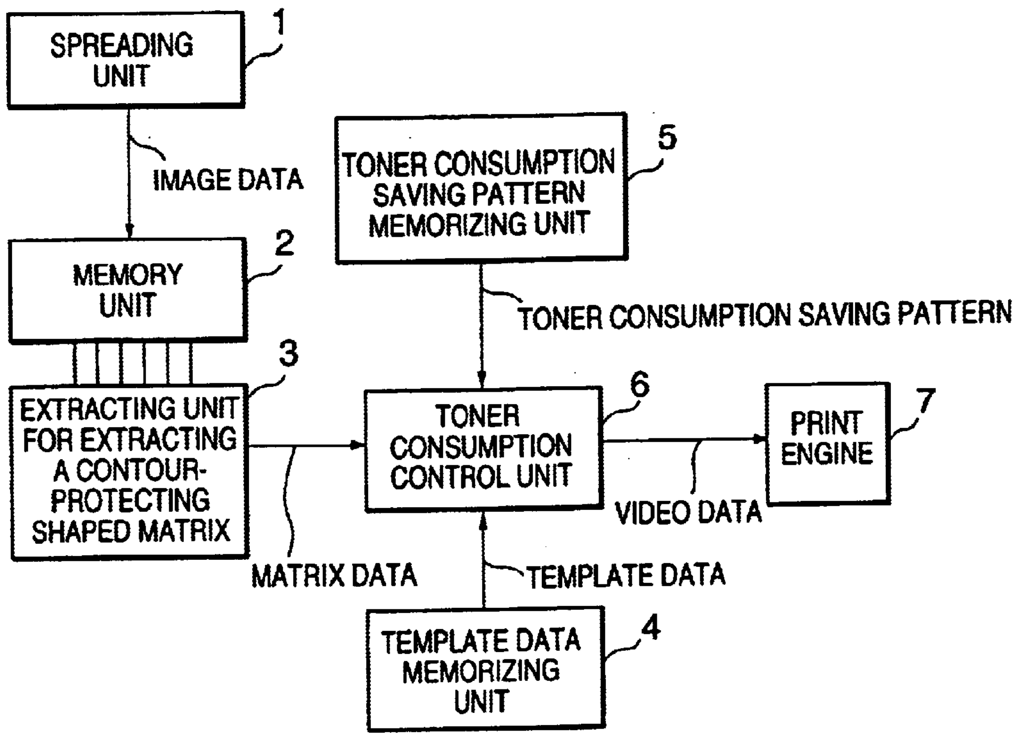
FIG. 1 is a block diagram for showing a constitution of a printer according to a first embodiment of the present invention.

Referring to FIGS. 1 through 6, description will proceed to a printer and a method of saving consumption of toner according to a first embodiment of the present invention. FIG. 1 is a block diagram for showing a constitution of the printer and the method of saving consumption of toner according to the first embodiment of the present invention.

As illustrated in FIG. 1, the printer according to this embodiment comprises a spreading unit 1, a memory unit 2, an extracting unit 3 for extracting a contour-protecting shaped matrix, a template data memorizing unit 4, a toner consumption saving pattern memorizing unit 5, a toner consumption control unit 6, and a print engine 7.

The spreading unit 1 is such an image data processing section that spreads data sent from an upper apparatus, such as a host computer (not shown) into bit map data.

The memory unit 2 is such a memory that stores the bit map data spread and output by the spreading unit 1. The memory unit 2 is, for example, FIFO (First In First Out) type memory composed of a plurality of memory elements each of which has a capacity capable of storing image data of primary scanning direction by one line.

The extracting unit 3 for extracting a contour-protecting shaped matrix is such a processing section that extracts a contour-protecting shaped matrix having a contour-protecting shape corresponding to the bit map data spread by the spreading unit 1.

The template data memorizing unit 4 is such an image data memorizing section that stores template data. The template data previously define various standard shapes of characters, symbols, or the like, which are frequently printed.

The toner consumption saving pattern memorizing unit 5 is such a memorizing section that memorizes a toner consumption saving pattern. The toner consumption saving pattern is applied to the contour-protecting shaped matrix having the contour-protecting shape extracted by the extracting unit 3, and the template data stored by the template data memorizing unit 4.

The toner consumption control unit 6 forms a final shape which is printed finally. The toner consumption control unit 6 then sends print data thus formed to the print engine 7 and makes the print engine 7 carry out printing of the print data. The control of such a toner consumption saving operation is based on each of the contour-protecting shaped matrix extracted by the extracting unit 3, the template data stored by the template data memorizing unit 4, and the toner consumption saving pattern stored by the toner consumption saving pattern memorizing unit 5.

The print engine 7 is such a printing section that carries out a printing operation based on the print data controlled by the toner consumption control unit 6.

With the above-mentioned structure, at first, data sent from the upper apparatus, such as the host computer (not shown) are spread in a buffer memory. The spread data are subjected to a parallel/serial conversion in order to be transmitted to the print engine 7. The parallel/serial converted image data are written in the memory unit 2 by five lines of primary scanning direction. Herein, the memory unit 2 is composed of five memory elements each of which has a capacity capable of storing image data of primary scanning direction by one line.

In order to recognize certain dots of pixels in a two-dimensional direction in the printer, matrix data are captured from bit map data stored in the memory unit 2. The matrix data are then compared with the template data stored by the template data memorizing unit 4. The toner consumption control unit 6 confirms whether or not the matrix data are matched with the template data. When the toner consumption control unit 6 determines that the matrix data are matched with the template data, the matrix data are subjected to a half tone dot meshing by the toner consumption control unit 6. The half tone dot meshed data are transmitted to the print engine 7 to be actually printed in a recording medium. Accordingly, toner consumption is saved in the printer of the first embodiment.

Next, referring to FIGS. 2 through 6, more detailed description is made as regards an operation of the printer according to the first embodiment of the present invention.

Figure 2:
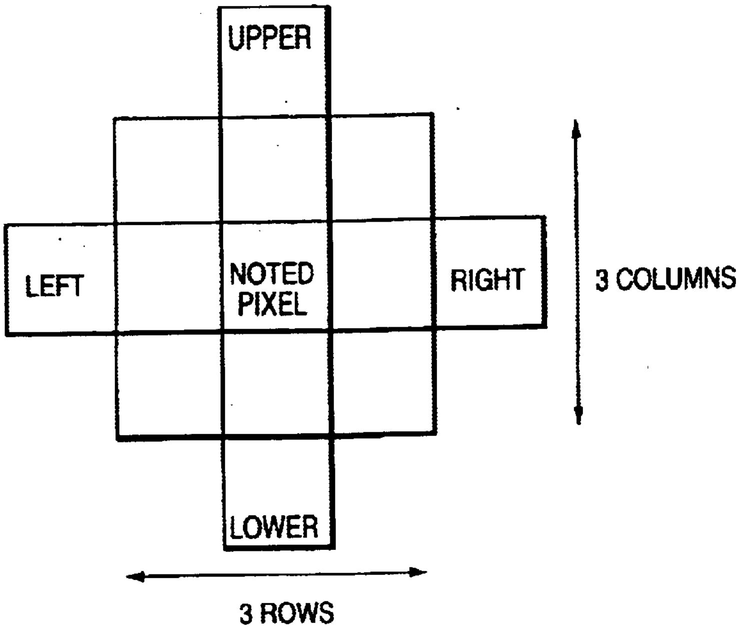
FIG. 2 is a view for showing an example of a contour-protecting shaped matrix.

As Illustrated in FIG. 2, a contour-protecting shaped matrix data having a contour-protecting shape is extracted by the extracting unit 3 for extracting a contour-protecting shaped matrix. The contour-protecting shape is a shape that comprises 3×3 pixels, two pixels added in upper and lower sides, respectively, and further two pixels added in left hand and right hand sides, respectively, as depicted in FIG. 2. The toner consumption control unit 6 replaces a noted pixel positioned in the central portion of the matrix with the toner consumption saving pattern, when the contour-protecting shaped matrix data having the above-mentioned shape are corresponding corresponds with the template data.

The contour-protecting shaped matrix comprises, for example, 3×3 pixels, two pixels added in upper and lower sides, respectively, and further two pixels added in left hand and right hand sides, respectively, as depicted in FIG. 2 mentioned before. On the other hand, the template data are composed of all black dots in the same shape as the contour-protecting shape, namely, 3×3 pixels, two pixels added in upper and lower sides, respectively, and further two pixels added in left hand and right hand sides, respectively. Meanwhile, the toner consumption saving pattern includes a group of pixels which comprises all white dots in the first line, black and white dots consisting of the beginning black dot, and the following white and black dots repeated one by one in the second line, all white dots in the third line, white and black dots consisting of the beginning white dot, and the following black and white dots repeated one by one in the fourth line. The group of pixels in these first through fourth lines are repeated continuously in sub-scanning direction within the toner consumption saving pattern.

Figure 3A:
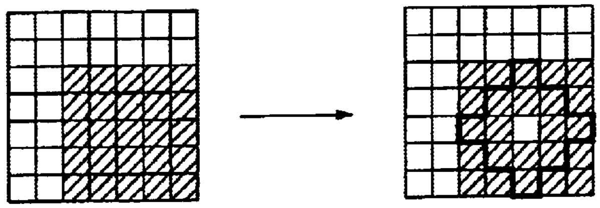
FIGS. 3A and 3B are examples in which the toner consumption saving operations are carried out, respectively.
Figure 3B:
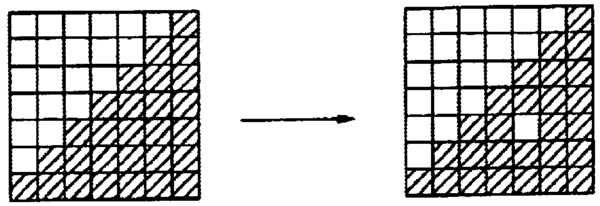
Figures 4A, 4B, 4C, 4D:
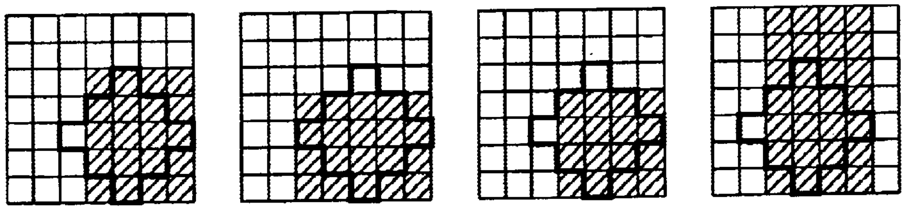
FIGS. 4A through 4H are examples in which the toner consumption saving operations are not carried out, respectively.
Figures 4E, 4F, 4G, 4H:
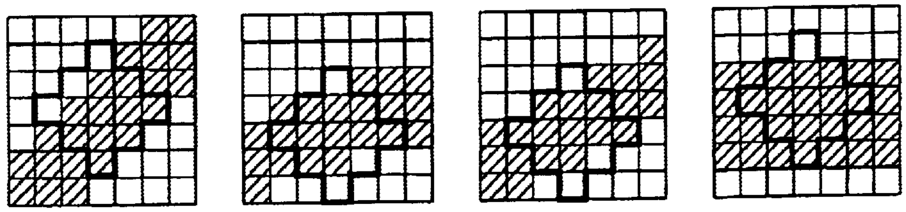

In FIG. 3, illustrated are examples in which the toner consumption saving operation is carried out. Thus, the toner consumption saving operation is carried out when the matrix of 3×3 pixels, two pixels added in upper and lower sides, respectively, and further two pixels added in left hand and right hand sides, respectively, has such pixels as composed of all black dots. The toner consumption saving operation is achieved by the half tone dot meshing, which is carried out by the toner consumption control unit 6, in correspondence with the toner consumption saving pattern.

In FIGS. 4A through 4H, illustrated are examples in which the toner consumption saving operation is not carried out. Thus, the toner consumption saving operation is not carried out when the matrix has such pixels as including any white dot.

Figure 5:
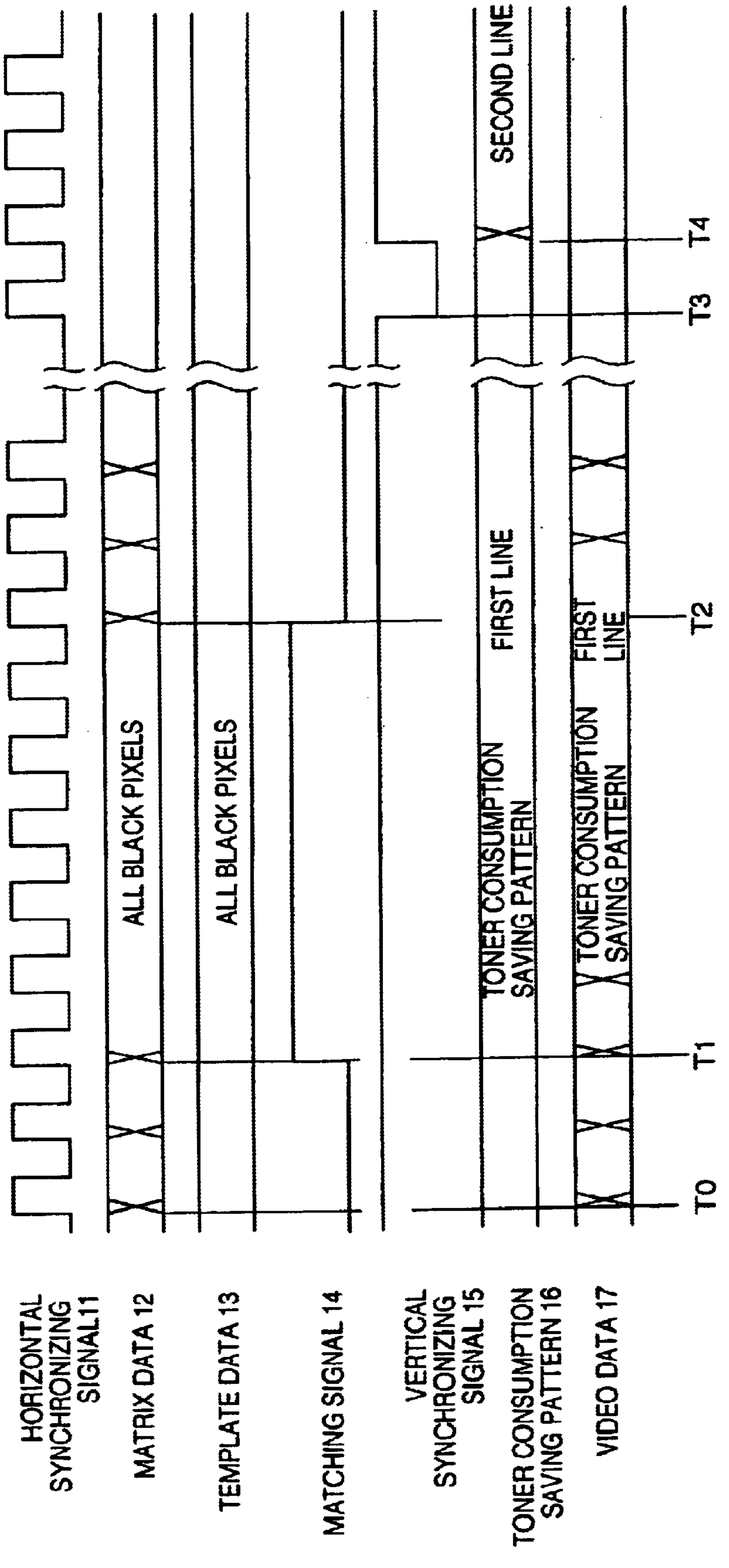
FIG. 5 is a timing chart between a horizontal synchronizing signal 11, matrix data 12, template data 13, a matching signal 14, a vertical synchronizing signal 15, a toner consumption saving pattern 16, and video data 17 in the first embodiment of the present invention.

In FIG. 5, illustrated is a timing chart between a horizontal synchronizing signal 11, matrix data 12, template data 13, a matching signal 14, a vertical synchronizing signal 15, a toner consumption saving pattern 16, and video data 17.

Now, referring to FIG. 5, the extracting unit 3 carries out the above-mentioned recognition of certain dots of pixels in a two-dimensional direction among bit map data in the memory unit 2 by moving the contour-protecting shaped matrix in a horizontal direction in response to the horizontal synchronizing signal 11. In this step, the matrix data 12 varies in response to the horizontal synchronizing signal 11, as illustrated in the timing T0 to T1. The template data 13 are previously memorized in the template data memorizing unit 4 as such data composed of all black dots. In the timing T1 to T2, when data composed of all black dots are extracted as the matrix data 12, the toner consumption control unit 6 turns the matching signal 14 to be enable while the data are kept matched with the template data 13.

In the toner consumption saving pattern memorizing unit 5, the toner consumption saving pattern 16 is produced and varied in response to the horizontal synchronizing signal 11. When the toner consumption saving pattern memorizing unit 5 recognizes the vertical synchronizing signal 15 from the print engine 7 to be enable at the timing T3, the toner consumption saving pattern memorizing unit 5 changes the toner consumption saving pattern 16 into a pattern of a next line at the timing T4.

When the matching signal 14 is enable, the toner consumption control unit 6 replaces a noted pixel positioned in a central portion of the contour-protecting shaped matrix illustrated in FIG. 2 with the toner consumption saving pattern 16 to produce the video data 17. On the other hand, when the matching signal 14 is disable, the toner consumption control unit 6 does not replace the noted pixel positioned in the central portion of the contour-protecting shaped matrix with the toner consumption saving pattern 16. The toner consumption control unit 6 outputs the video data 17 into the print engine 7 by synchronizing the video data 17 with the horizontal synchronizing signal 11.

Figure 6:
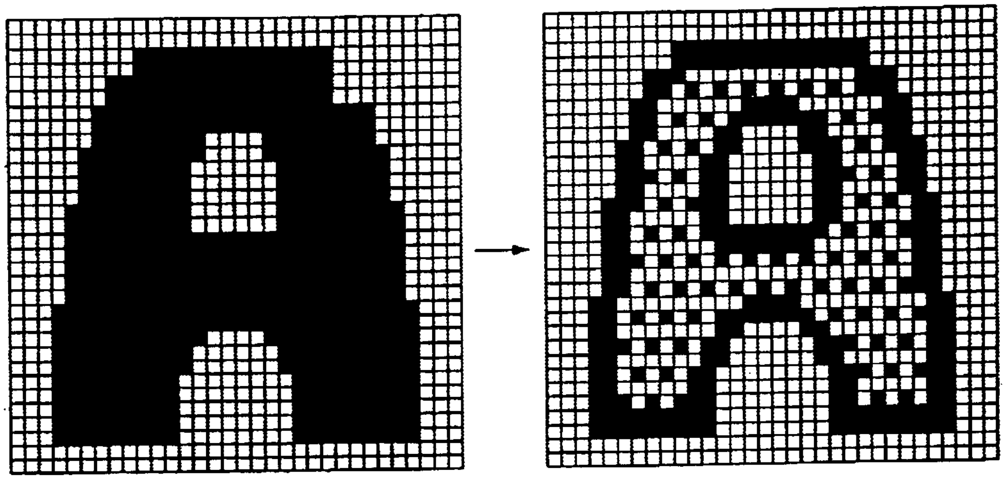
FIG. 6 is an example in which the toner consumption saving operation has been carried out in the first embodiment of the present invention.

In FIG. 6, illustrated is an example in which the toner consumption saving operation has been carried out. By the toner consumption saving operation, an image shown in left hand side of FIG. 6 is turned into another image having a remained contour of width of two pixels shown in right hand side thereof.

As mentioned above, according to the first embodiment of the present invention, image data are spread into bit map data by the spreading unit 1 to be stored in the memory unit 2. Then, the extracting unit 3 for extracting a contour-protecting shaped matrix extracts matrix data of a predetermined shape and numbers of dots from the memory unit 2. In this extraction, extracted is such matrix data that comprises 3×3 pixels, two pixels added in upper and lower sides, respectively, and further two pixels added in left hand and right hand sides, respectively, as depicted in FIG. 2. By using the matrix data, the template matching and the replacement with the toner consumption saving pattern are carried out in the toner consumption control unit 6. As a result, the toner consumption saving operation is completed to obtain the another image having a remained contour of width of two pixels. Accordingly, deformation or disappearance of a contour due to thinning of the contour can be prevented in a printer, even though the printer has a high resolution.

Further, according to the first embodiment of the present invention, the toner consumption control unit 6 compares the matrix data extracted by the extracting unit 3 for extracting a contour-protecting shaped matrix with the predetermined template data stored by the template data memorizing unit 4. When the matrix data corresponds with the predetermined template data, the toner consumption control unit 6 replaces a noted pixel positioned in a central portion of the matrix with the toner consumption saving pattern. Accordingly, numbers of black dots can be decreased in a part of image data to save toner consumption in the printer. Herein, since the matrix of a predetermined numbers of pixels is compared with the template, pixels (black dots) can be reduced as a rectangular or cross-shaped unit or group of pixels. Consequently, the toner consumption can be saved without unpreparedly deleting dots constituting a fine line, dots expressing a delicate curve, and necessary dots for expressing gradation. Particularly, it is remarkable that the contour of width of two pixels can be remained in the first embodiment of the present invention. Thereby, deformation or disappearance of the contour due to thinning of the contour can be prevented, even though a toner saving mode is used in a printer having a print engine of a high resolution. As a result, quality of a printed image can be prevented from being deteriorated.

Figure 7:
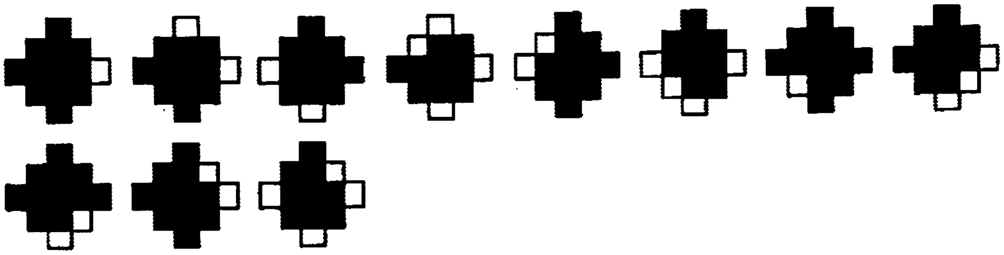
FIG. 7 is a view for showing an example of template data according to a second embodiment of the present invention.

Referring to FIGS. 7 and 8, description will proceed to a printer and a method of saving consumption of toner according to a second embodiment of the present invention. FIG. 7 is an explanation view of an example in which a toner consumption saving operation according to the second embodiment has been performed. FIG. 8 is an explanation view of another example in which a toner consumption saving operation according to the second embodiment has also been performed. In FIGS. 7 and 8, a toner consumption saving pattern comprises all white dots in order to facilitate an understanding of deletion of pixels (black dots) in the second embodiment.

Figure 8A:
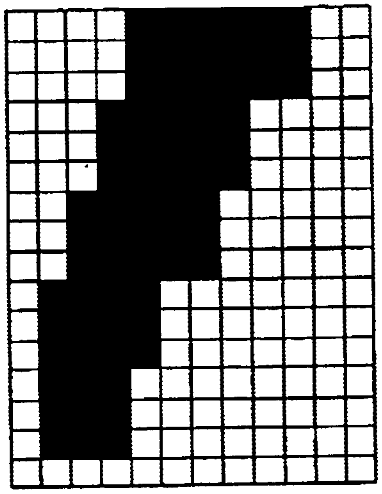
FIG. 8 is an example in which the toner consumption saving operation has been carried out in the second embodiment of the present invention.
Figure 8B:
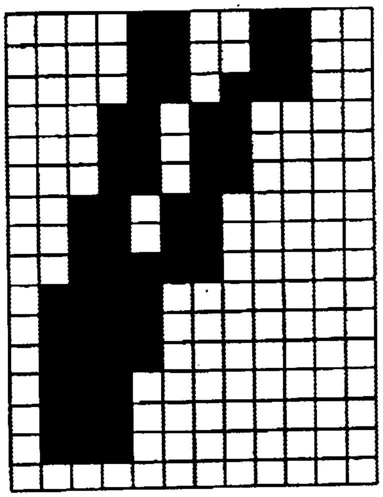
Figure 8C:
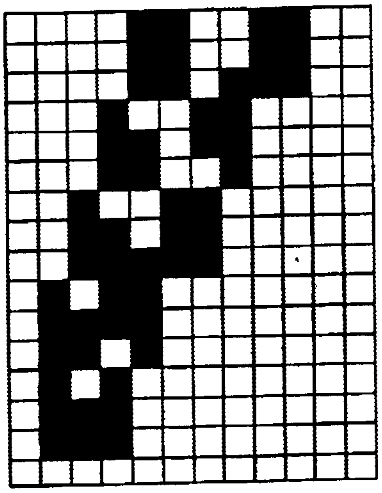

In this embodiment, as illustrated in FIG. 7, template data are determined to include such data that have white pixels (white dots) in a part of the outer contour. On the other hand, FIG. 8A shows bit map data which is a swept portion of character data. FIG. 8B shows an example in which template data comprise all black dots. FIG. 8C shows an example in which template data comprise data illustrated in FIG. 7. In the image data illustrated in FIG. 8A, the contour shown in FIG. 8B is remained when the template data comprise all black pixels (dots). On the contrary, deleted pixels are increased, as will be understood from FIG. 8C, in this embodiment of the present invention.

In the interim, disappearance of the contour seldom is caused to occur in a portion of image data, such as a swept portion of character data, since a space between contours is narrow therein. As mentioned above, according to the second embodiment of the present invention, it becomes possible that the toner consumption saving operation can be applied to such a portion of image data, for example, a swept portion of character data. Therefore, more pixels can be deleted by the toner consumption saving operation in the second embodiment of the present invention.

While the present invention has thus far been described in conjunction with only two embodiments thereof, it will now be readily possible for one skilled in the art to put the present invention into effect in various other manners.

For example, in the above-mentioned embodiments, the toner consumption saving technique is described with reference to a printer. However, the toner consumption saving technique can be generally applied to image forming apparatus, such as a facsimile machine, a copying machine, and the like. In such an application, an object of the toner consumption saving technique is not restricted to a character and a symbol.

What is claimed is:

1. An image forming apparatus which is for use in printing data sent from an upper apparatus, said image forming apparatus comprising:

storing means for storing said bit map data of characters and symbols;

extracting means for extracting contour-protecting shaped matrix data having a contour-protecting shape which prevents a contour of image from disappearing;

printing means for printing said dot data based on said contour-protecting shape;

template data memorizing means for memorizing template data which previously define a standard shape of a character and a symbol;

toner consumption saving pattern memorizing means for memorizing toner consumption saving pattern data which corresponds said standard shape or character and said symbol; and toner consumption control means for forming a final shape which is printed finally based on each of said contour-protecting shaped matrix data, said template data,and said toner consumption saving pattern data;

wherein said printing means, in response to said contour-protecting shape matrix data, produces an unbroken contour of a character or symbol having a width of two pixels and a reduction of pixel density in the interior of said character or symbol.

2. An image forming apparatus as claimed in claim 1, wherein said image forming apparatus is a printer.

3. An image forming apparatus as claimed in claim 1, wherein said contour-protecting shaped matrix data comprise 3×3 pixels, two pixels added in upper and lower sides, respectively, and further two pixels added in left hand and right hand sides, respectively.

4. An image forming apparatus as claimed in claim 3 wherein a template data is compared to said contour-protecting shape matrix data, said template data composed of all black dots in the same shape as that of said contour-protecting shaped matrix data.

5. A method of saving consumption of toner of an image forming apparatus for use in printing data sent from an upper apparatus, said method comprising the steps of:

storing said bit map data of characters and symbols;

extracting contour-protecting shaped matrix data having a contour-protecting shape which prevents a contour of image from being disappeared;

printing said dot data based on said contour-protecting shape;

memorizing template data which previously define a standard of a character and a symbol;

memorizing toner consumption saving pattern date which corresponds said standard shape of said character and said symbol; and of controlling toner consumption to form a final shape which is printed finally based on each of said contour-protecting shaped matrix data, said template data, and said toner consumption saving pattern data;

wherein said printing means, in response to said contour-protecting shape matrix data, produces an unbroken contour of a character or symbol having a width of two pixels and a reduction of pixel density in the interior of said character or symbol.

6. An image forming apparatus which is for use in printing data sent from an upper apparatus, said image forming apparatus comprising:

spreading means for spreading said data sent from said upper apparatus into bit map data consisting of dot data;

storing means for storing said bit map data spread by said spreading means;

extracting means for extracting contour-protecting shaped matrix data having a contour-protecting shape which prevents a contour of image from disappearing;

printing means for printing said dot data based on said contour-protecting shape;

template data memorizing means for memorizing template data defining a standard shape of a character and a symbol;

toner consumption saving pattern memorizing means for memorizing toner consumption saving pattern data which corresponds to said standard shape of said character and said symbol; and toner consumption control means for forming a final shape which is printed based on each of said contour-protecting shaped matrix data, said template data, and said toner consumption saving pattern data.

7. A method of saving consumption of toner of an image forming apparatus for use in printing data sent from an upper apparatus, said method comprising the steps of:

spreading said data sent from said upper apparatus into bit map data consisting of dot data;

storing said bit map data spread in said spreading step;

extracting contour-protecting shaped matrix data having a contour-protecting shape which prevents a contour of image from disappearing;

printing said dot data based on said contour-protecting shape;

memorizing template data which defining a standard shape of a character and a symbol;

memorizing toner consumption saving pattern data which corresponds to said standard shape of said character and said symbol; and controlling toner consumption to form a final shape which is printed based on each of said contour-protecting shaped matrix data, said template data, and said toner consumption saving pattern data.

* * * * *